United States Patent
Su et al.

(10) Patent No.: US 11,704,078 B2
(45) Date of Patent: Jul. 18, 2023

(54) SYSTEM AND METHOD FOR TRACKING PHYSICAL CHARACTERISTICS OF MULTIFUNCTION PERIPHERAL USERS TO DETERMINE DEVICE USER SATISFACTION

(71) Applicant: Toshiba TEC Kabushiki Kaisha, Shinagawa-ku (JP)

(72) Inventors: William Su, Riverside, CA (US); Christopher Nguyen, Lake Forest, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 71 days.

(21) Appl. No.: 17/406,263

(22) Filed: Aug. 19, 2021

(65) Prior Publication Data

US 2023/0058061 A1    Feb. 23, 2023

(51) Int. Cl.
    *G06F 3/12*      (2006.01)
    *G06T 7/73*      (2017.01)
    *G06F 21/32*     (2013.01)
    *G06V 40/16*     (2022.01)

(52) U.S. Cl.
    CPC .......... *G06F 3/1222* (2013.01); *G06F 3/1203* (2013.01); *G06F 3/1238* (2013.01); *G06F 3/1279* (2013.01); *G06F 21/32* (2013.01); *G06T 7/73* (2017.01); *G06V 40/172* (2022.01); *G06V 40/174* (2022.01); *G06V 40/178* (2022.01); *G06V 2201/07* (2022.01)

(58) Field of Classification Search
    None
    See application file for complete search history.

(56) References Cited

U.S. PATENT DOCUMENTS

| | | | | |
|---|---|---|---|---|
| 11,508,474 B2* | 11/2022 | Hresko | ................ | G16H 40/60 |
| 2006/0187309 A1* | 8/2006 | Ban | .................... | H04N 1/00962 |
| | | | | 348/E5.043 |
| 2009/0210240 A1* | 8/2009 | Benschop | ........ | G06Q 20/40145 |
| | | | | 705/317 |
| 2013/0159021 A1* | 6/2013 | Felsher | ................. | G16H 10/60 |
| | | | | 705/3 |
| 2013/0345840 A1* | 12/2013 | Lempel | ................ | G06F 16/683 |
| | | | | 700/94 |
| 2014/0064577 A1* | 3/2014 | Kato | .................... | G06V 40/172 |
| | | | | 382/118 |
| 2021/0186370 A1* | 6/2021 | Dellimore | ................ | A61B 5/08 |

\* cited by examiner

*Primary Examiner* — Haris Sabah
(74) *Attorney, Agent, or Firm* — Ulmer & Berne LLP; John Garred (57) ABSTRACT

A system and method for tracking multifunction peripheral device user satisfaction captures user images and audio during device operation. User characteristics such as gestures, posture, spoke words or facial expressions are used in conjunction with device status information to determine whether the user is satisfied with the device. If not, remedial action is initiated, such as launching a virtual assistant on the multifunction peripheral touchscreen or summoning of a human assistant.

18 Claims, 6 Drawing Sheets

SYSTEM AND METHOD FOR TRACKING PHYSICAL CHARACTERISTICS OF MULTIFUNCTION PERIPHERAL USERS TO DETERMINE DEVICE USER SATISFACTION

TECHNICAL FIELD

This application relates generally to printing. The application relates more particularly to monitoring physical characteristics of multifunction peripheral users to determine whether they are satisfied with operation of the device.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are complex devices. Users interacting with devices may become angry or frustrated when they are unable use MFP functions to the extent desired, such as when they do not understand a user interface sufficiently. They may also be frustrated when device errors occur, such as paper jams, out of paper, out of toner or out of ink. Frustrated users can affect an overall workplace mood, and this worker productivity. If device users are routinely frustrated, they may push for a device from a different manufacturer.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

It would be advantageous in situations noted above if an MFP user's satisfaction or dissatisfaction could be determined. Systems may attempt "emotion recognition," based on facial image. People do smile when they are happy and frown when they're sad, but the correlation is weak. People can exhibit other actions or body movements when they are happy or sad. Reliance on a smile can be incorrect given that smiles can be wry or ironic. Behaviors vary among cultures and situations. Also, context can play a role in interpreting expressions. A study suggests that most claims made by "emotion recognition" companies frequently make incorrect conclusions.

Humans use a lot of information to gauge an emotional state, both consciously and unconsciously. These include facial expressions, body language, a person's location, and more. When computers try to do the same thing, they tend to focus only on the face.

Example embodiments herein solve this issue by not only scanning the customers' faces, but also gathering information such as voice, posture, or what is happening in the environment. MFP information such as paper jam, out of toner, and out of paper etc. is factored in to determine a user's emotional state.

By way of example, a user prints a document. The user looks at the printed document, smiles and leaves. This user is satisfied.

In another example, an MFP experiences a paper jam, runs out of paper, runs out of toner or ink, or experiences a device error. A user exposed to such situations is likely very dissatisfied and may require assistance to address the situation.

In another example a user changes settings and reprints their document. The user may be dissatisfied at the need to reprint.

In another example, a user may say some positive things about the printed document. This user is likely satisfied. Conversely, if the user says negative things about the printed document, the user is likely dissatisfied.

In another example, a user tears the printed document up and throws it away, which generates both associated audible and visible indicators. This user is likely dissatisfied.

In further example embodiments herein, user attributes such as age are determined for purposes such as enforcing a scan or print of age restricted documents. Scans through videos using physical data, apparel data and fashion data assist in identifying a person's age.

As detailed below, in example embodiments an MFP can track MFP user satisfaction based on the certain items at specific periods before, during and after the service is provided. These include recognition of facial expressions from video, spoken expressions from audio and a user's postures or motions. Satisfaction can also be determined in conjunction with MFP status, such as paper jam, out of paper or out of toner situations. If a user is dissatisfied, the MFP portal will display a virtual assistant to help the user immediately. Humans can also be summoned to assist the user and keep them satisfied. Such data is suitably streamed to a cloud server which summarize results valuable feedback such as:

a. Which MFPs satisfy users more?
b. Which MFPs dissatisfy users more?

c. What type of documents (color, black, DIP, etc.) satisfy users more?

d. Which group of users (age, gender, etc.) are most satisfied?

A digital camera, such as a camera integrated with an MFP, MFP provides images to measure a user's emotional state. If the user is dissatisfied, the MFP portal displays a virtual assistant to help the user immediately. Human assistants can be called to assist. Data is streamed to the cloud server, where it is processed securely. Emotions are detected and analyzed, and suitably summarize the results and report to a real time dashboard.

Figure 1:
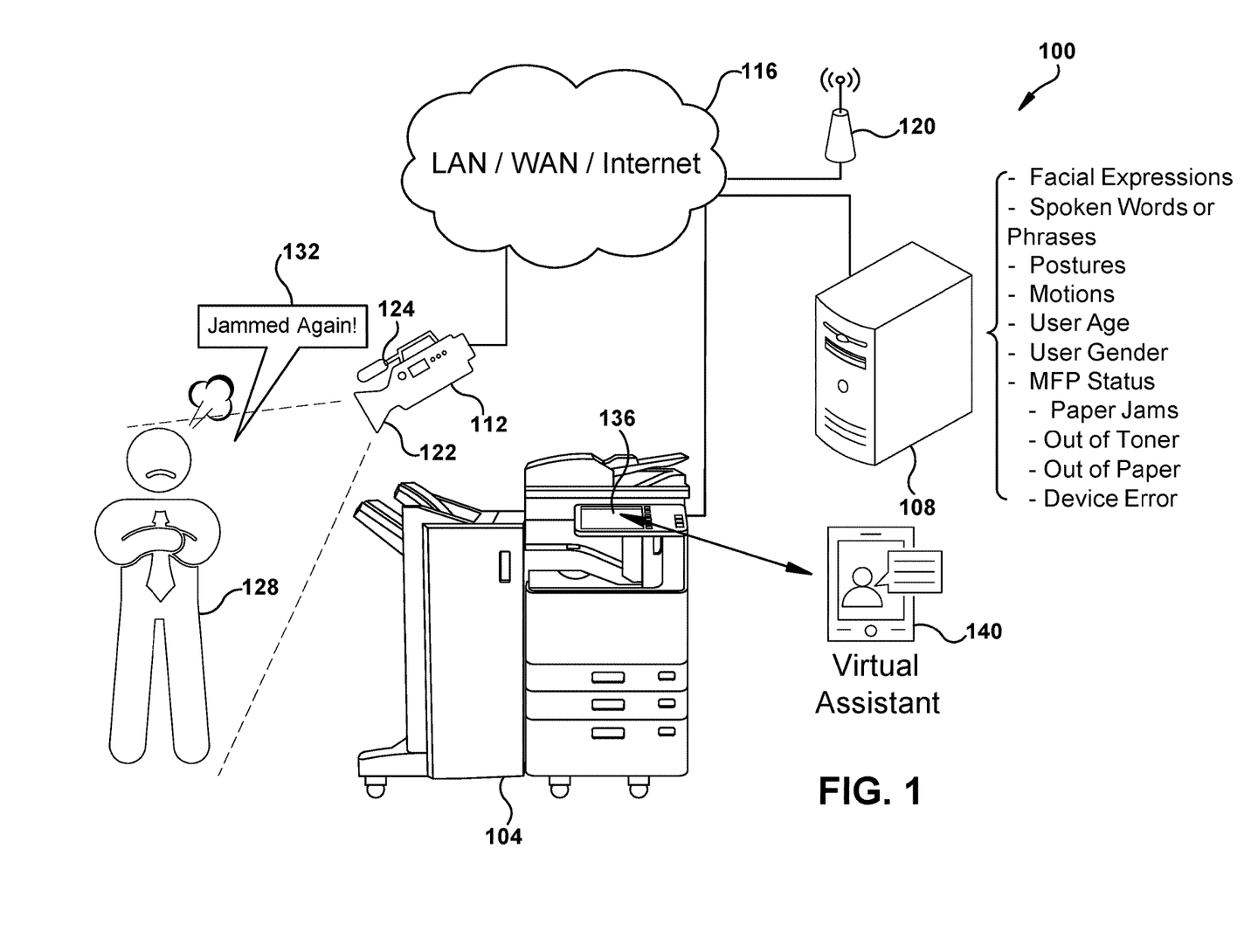
FIG. 1 is an example embodiment of a system for tracking device user satisfaction in devices such as multifunction peripherals.

FIG. 1 illustrates an example embodiment of a system for tracking device user satisfaction in devices such as MFPs. MFP 104 is in data communication with server 108 and camera 112 via network cloud 116. Network cloud 116 suitably comprised of a local area network (LAN), a wide area network (WAN), which may comprise the Internet, or any suitable combination thereof. Network cloud 116 is comprised of any suitable wireless or wired data connection or combination thereof. Wireless data communication is in any suitable fashion, such as via Wi-Fi hot spot 120. Camera 112 is suitably a standalone device or integrated into MFP 104. Camera 112 is configured for video capture via lens 122 and digital audio capture via microphone 124.

In the example of FIG. 1, device user 128 is in a frustrated or angry state, such as might be induced by MFP issues as noted above. One or more digital images of user 128 are captured by camera 112 via lens 122. Verbal comments 132 from user 128 are captured by microphone 124 of camera 112. Both image and sound input is used to determine a mood of user 128, suitably by server 108, or by processing power directly in MFP 104. Captured information such as facial expressions, spoken words or phrases, user posture, user motions lead to a determination of factors such as the user's age or gender. A hardware monitor in MFP 104 also provides server 108 with MFP status information, such paper jams, toner or ink levels, paper levels and device errors. Such status data is used in conjunction with image data and sound data to determine that user 128 is dissatisfied. Once such a determination has been made, remedial imagery is generated on touchscreen 136 of MFP 104. Such remedial imagery may comprise launching of virtual assistant 140 which can aid user 128 in connection with frustrating device issues.

Figure 2:
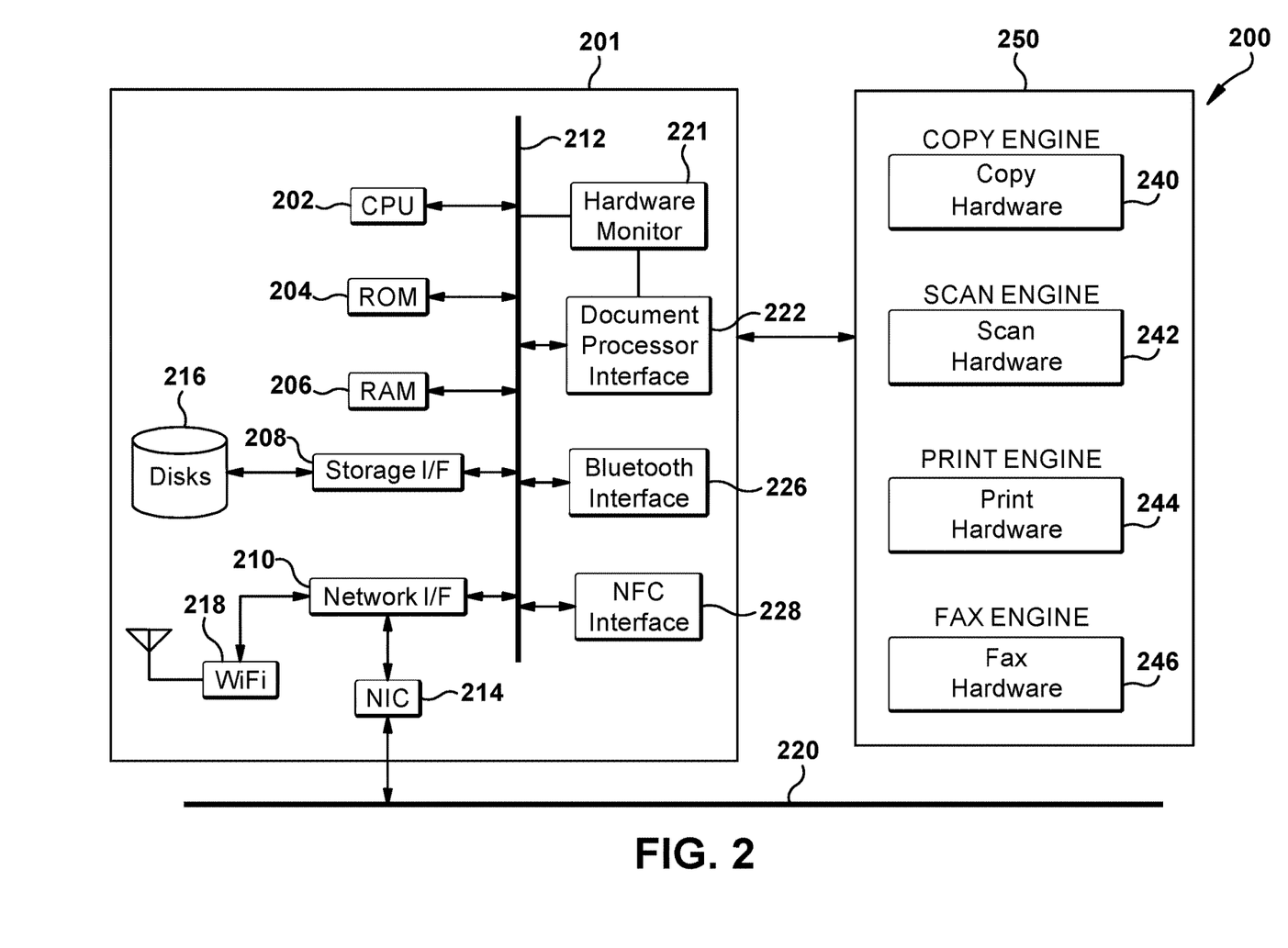
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFP 104 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless data connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) interface 219 which provides data communication for interfacing with user peripherals, such as displays, keyboards, mice, track balls, touch screens, or the like. Processor 202 can also be in communication with hardware monitor 221, such as a page counter, temperature sensor, toner or ink level sensor, paper level sensor, or the like.

Also in data communication with data bus 212 is a document processor interface 222 suitable for data communication with the document rendering system 200, including MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
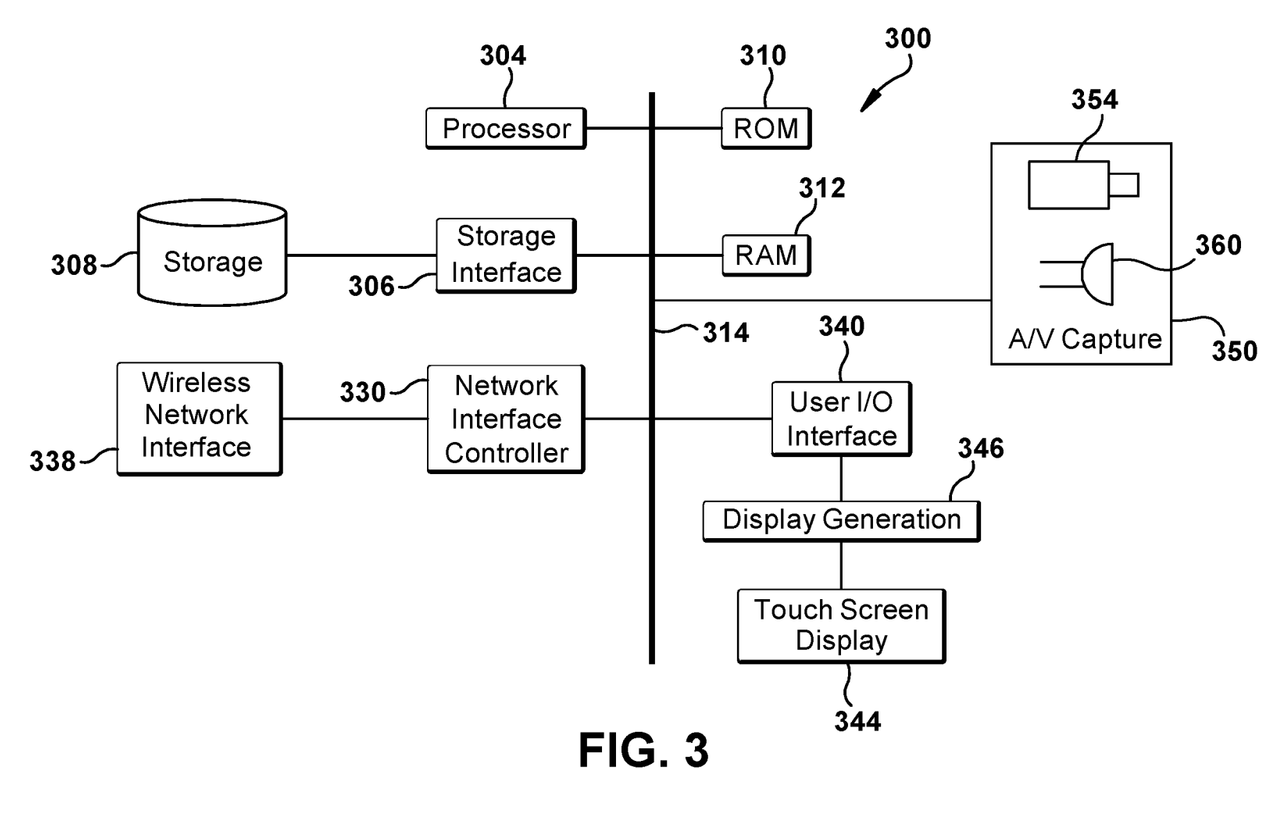
FIG. 3 is an example embodiment of a digital device system.

Turning now to FIG. 3, illustrated is an example embodiment of a digital data processing device 300 such as server 108 of FIG. 1. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. A network interface controller 330 suitably provides a gateway for data communication with other devices, such as via wireless network interface 338. A user input/output interface 340 suitably provides display generation 346 providing a user interface via touchscreen display 344, suitably displaying images from display generator 346. It will be understood that the computational platform to realize the system as detailed further below is suitably implemented on any or all of devices as described above.

Processor 304 is also in data communication with audio/video capture system 350 which includes video capture component 354 and audio capture component 360.

Figure 4:
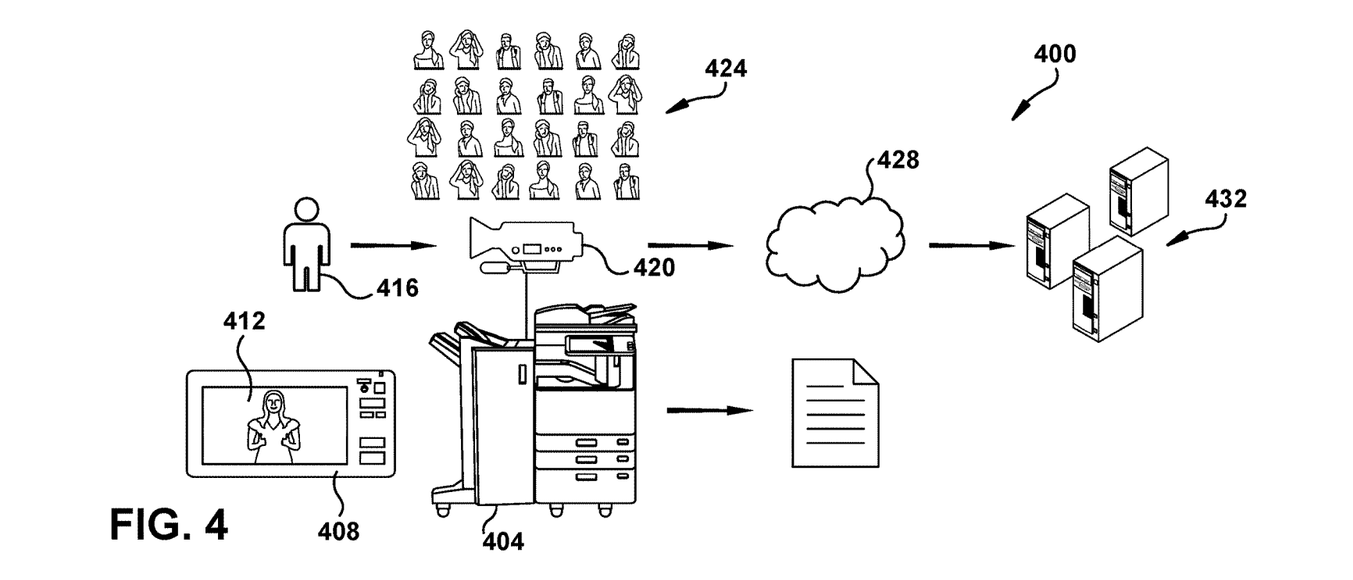
FIG. 4 is a system overview for an example embodiment of a system for tracking device user satisfaction.

FIG. 4 illustrates a system overview 400 for an example embodiment of a system for tracking device user satisfaction. The system includes MFP 404 which includes touchscreen user interface 408, displaying virtual assistant 412. Audio and video capture information is acquired from MFP user 416 via camera 420. Included in captured image data are expressions, gestures and postures 424 of user 416. Such information is passed via network cloud 428 to one or more servers 432.

Figure 5:
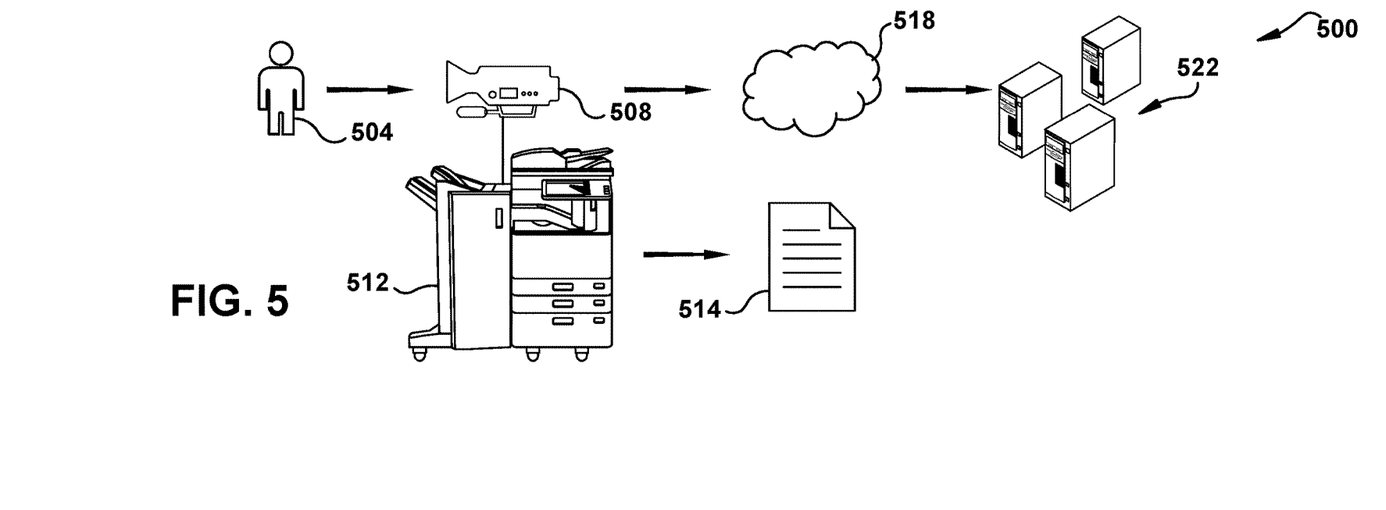
FIG. 5 is a hardware module block diagram of an example embodiment of a system for tracking device user satisfaction.

FIG. 5 illustrates a hardware module block diagram 500 of an example embodiment of a system for tracking device user satisfaction for MFP user 504. Image and sound data are captured by camera 508 and device status data obtained from MFP 512 which is processing document 514. Gathered data is sent via network cloud 518 to one or more servers 522.

Figure 6:
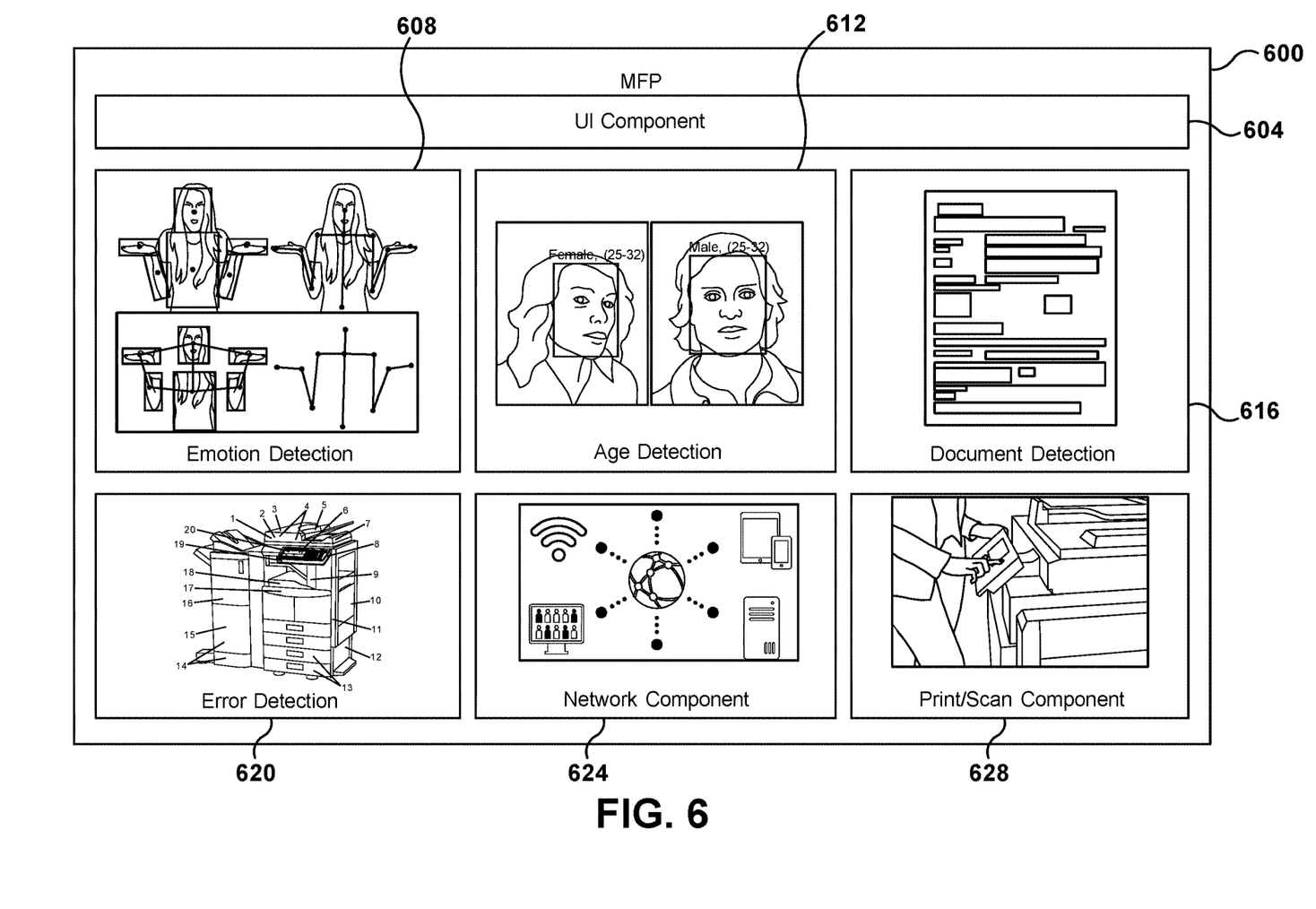
FIG. 6 is an example embodiment of a software module block diagram of an example embodiment of software running on an MFP to track user satisfaction.

FIG. 6 is a software module block diagram 600 of an example embodiment of software running on an MFP to track user satisfaction. Include is a user interface component module 604, an emotion detection module 608, an age detection module 612 and a document detection module 616. Also included is an error detection module 620, a network component module 624 and print/scan component module 628.

Figure 7:
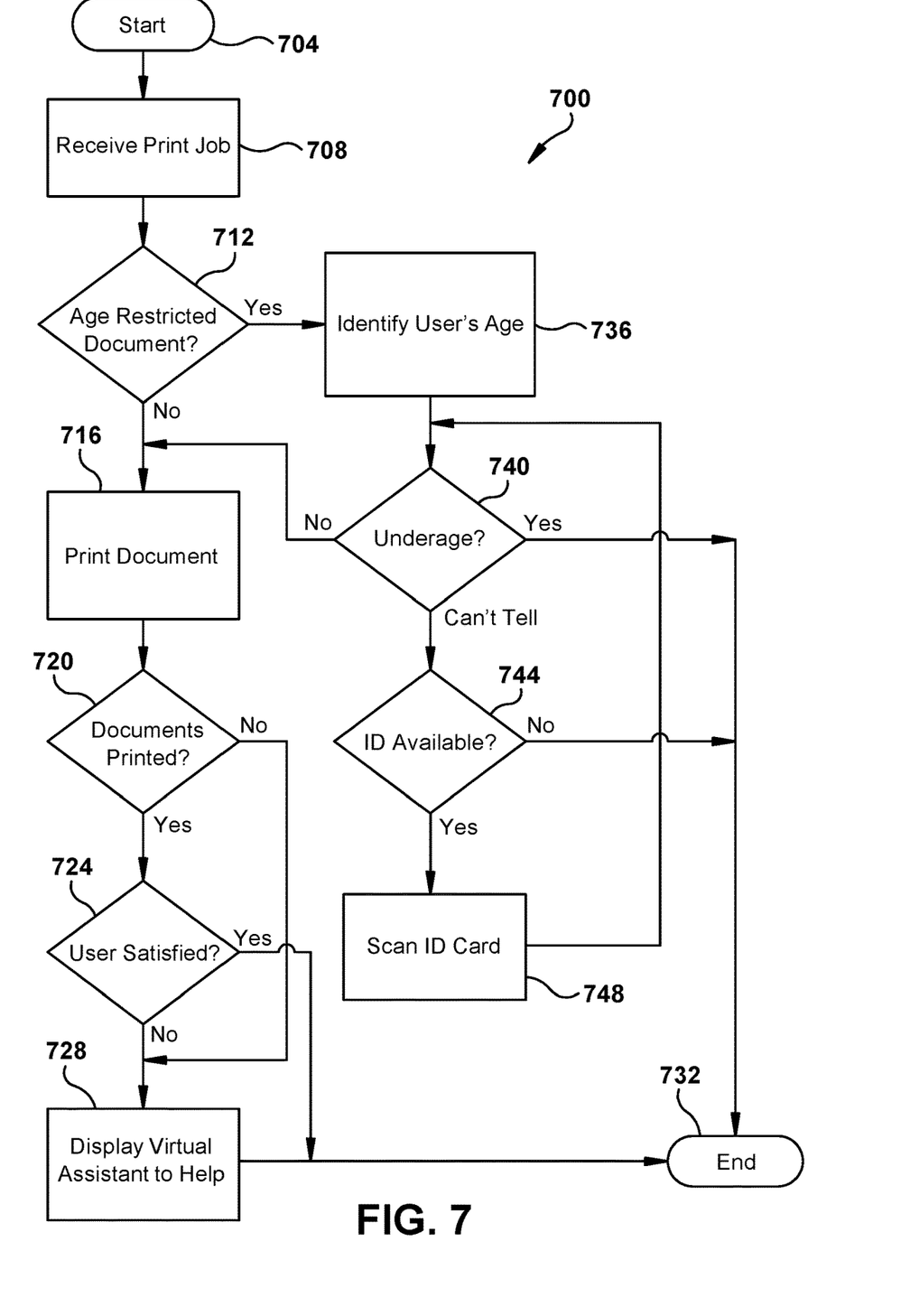
FIG. 7 is a flowchart of an example embodiment of a system for tracking user satisfaction and enforcing age control restrictions for age restricted document content.

FIG. 7 is a flowchart 700 of an example embodiment of a system for tracking user satisfaction and enforcing age control restrictions for age restricted document content. The process commences at block 704 and proceeds to block 708 where a print job is received. A test is made at block 712 as to whether a document includes age restricted content, such as by image content, wording used, flagging or the like. If not, the document is set for printing at block 716, and a test is made at block 720 as to whether printing was successful. If so, a test is made at block 724 to determine if a user associated with the print job is satisfied as described above. If the user is determined to be unsatisfied, a virtual assistant is displayed at block 728 before the process ends at block 732. If a user is determined to be satisfied at block 724, the process proceeds to terminate at block 732.

If age restricted content is found, the user's age is determined as best possible at block 736 and a test is made at block 740 as to whether the user's age is above or below an age threshold associated with the age restricted content. If it is determined that the user is not underage, the process moves to block 716 and proceeds as detailed above. If the user is determined to be underage or if a clear conclusion cannot be made at block 740, a check is bade at block 744 to determine if the user as an ID evidencing their age, such as a driver's license, passport or other government issued ID. If so, their ID is scanned at block 748 and the process returns to block 740 to determine if the user is in fact of sufficient age for the restricted content. If so, the process proceeds to block 712 and proceeds as detailed above. If the user is confirmed to be underage, the process ends at block 732.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A stem comprising:
    a processor;
    a display,
    memory storing a print job associated with a device user;
    a print engine configured to render the print job;
    a digital camera configured to capture one or more digital images of the device user;
    the processor configured to determine one or more physical characteristics of the device user from the one or more digital images; and
    the processor further configured to control operation of a device associated with the device user in accordance with one or more ermined physical characteristics of the device user;
    wherein a determined physical characteristic of the device user includes posture or motion of the device user, and wherein the processor is further configured to;
        determine whether the device user as a positive emotional state or a negative emotional state in accordance with the determined physical characteristic of the device user;
        render remedial images on the display when it is determined that the device user has the negative emotional state.

2. The system of claim 1 wherein the ice associated with the device user comprises the print engine, wherein a determined physical char eristic is an age of the device user, and wherein the processor is further configured to:
    determine whether the print job includes age restricted content, the age restricted content setting an age threshold;
    determine whether the age of the device user is below t age threshold, and
    control operation of the print engine to prevent it from rendering the print job when it is determined to include age restricted content and when the age of the ice user is below the age threshold associated with the age restricted content.

3. The system of claim 2 further comprising:
    a scanner configured to scan an ID of the device user;
    wherein the processor is further configured to determine the age of the device user from the scan of the ID; and
    wherein the processor is further configured to control operation of the print engine to render the print job when the age of the device user determined from the scan of the ID is above the age threshold.

4. The system of claim 1 wherein the remedial images comprised a virtual assistant for the device associated with the device user.

5. The system of claim 1 wherein the one or more physical characteristics of the device user include digitized sounds captured from the device user via a digital microphone.

6. The system of claim 1 further wherein the device associated with the device user includes a hardware monitor configured to generate device information corresponding to a status thereof, and wherein the processor is further configured to determine whether the device user has the positive emotional state or the negative emotional state in accordance with generated device information.

7. The system of claim 6 wherein the device associated with the device user is comprised of a multifunction peripheral, and wherein the device information includes indications of one or more of paper jams, toner level, paper level, ink level and error codes.

8. A method comprising:
    a processor;
    memory storing a print job associated with a device user;
    capturing one or more digital images of the device user via a digital camera;
    determining one or more physical characteristics of the device user from the one or more digital images;
    controlling operation of a device associated with the device user in accordance with one or more determined physical characteristics of the device user;
    determining, whether the device user has a positive emotional state or a negative emotional state in accordance with a determined physical characteristic including posture or motion of the device user, and
    rendering remedial images on a display when it is determined that the device user has the negative emotional state.

9. The method of claim 8 wherein the device associated with the device user comprises a print engine, wherein a determined physical characteristic is an age of the device user, and further comprising:
    determining whether the print job includes age restricted content, the age restricted content setting an age threshold;
    determining whether the age of the device user, and
    controlling operation of the print engine to prevent it from rendering the print job when it is determined to include age restricted content and when the age of the device user is below the age threshold associated with the age restricted content.

10. The method of claim 9 further comprising:
scanning an ID of the device user;
determining the age of the device user from a scan of the ID; and
controlling operation of the print engine to render the print job when the age of the device user determined from the scan of the ID is above the age threshold.

11. The method of claim 8 wherein the remedial images comprise a virtual assistant for the device associated with the device user.

12. The method of claim 8 wherein the one or more physical characteristics of the device user include digitized sounds captured from the device user via a digital microphone.

13. The method of claim 8 further wherein the device associated with the device user includes a hardware monitor configured to generate device information corresponding to a status thereof, and further comprising determining whether the device user has a the positive emotional state or the negative emotional state in accordance with generated device information.

14. The method of claim 13 wherein the device associated with the device user is comprised of a multifunction peripheral, and wherein the device information includes indications of one or more of paper jams, toner level, paper level, ink level and error codes.

15. A system comprising:
a touchscreen user interface;
a print engine configured to render tangible documents from an electronic print job;
a scan engine configured to generate scan files from a scan of tangible documents;
a camera configured to capture or more digital images of a user of a multifunction peripheral into memory;
the memory storing an electronic document;
a hardware monitor configured to generate device information corresponding to a status of the multifunction peripheral;
a processor configured to determine one or more physical characteristics of a device user in accordance with image data comprising the one or more digital images, the one or more physical characteristics including one or more of age, posture and motions of the user;
the processor further configured to determine whether the user has a positive emotional state or a negative emotional state in accordance with a determined physical characteristic of the user and the device information;
the processor further configured to render remedial images on a display when it is determined that the user has the negative emotional state.

16. The multifunction peripheral of claim 15 further comprising a microphone configured to capture digitized sounds from the user, and wherein the processor is further configured to determine whether the user has the positive emotional state or the negative emotional state in accordance with the digitized sounds.

17. The system of claim 15 wherein the processor is further configured to:
determine an age of the user in accordance with the image data,
determine if a print job includes age restricted content, and
disable the print engine from rendering the print job when the age of the user is below an age threshold associated with age restricted content.

18. The system of claim 15 wherein the remedial images comprise a virtual assistant for the multifunction peripheral.

* * * * *